Brown & Bartlett.
Mower.
No. 1281
Reissued Feb. 25, 1862.
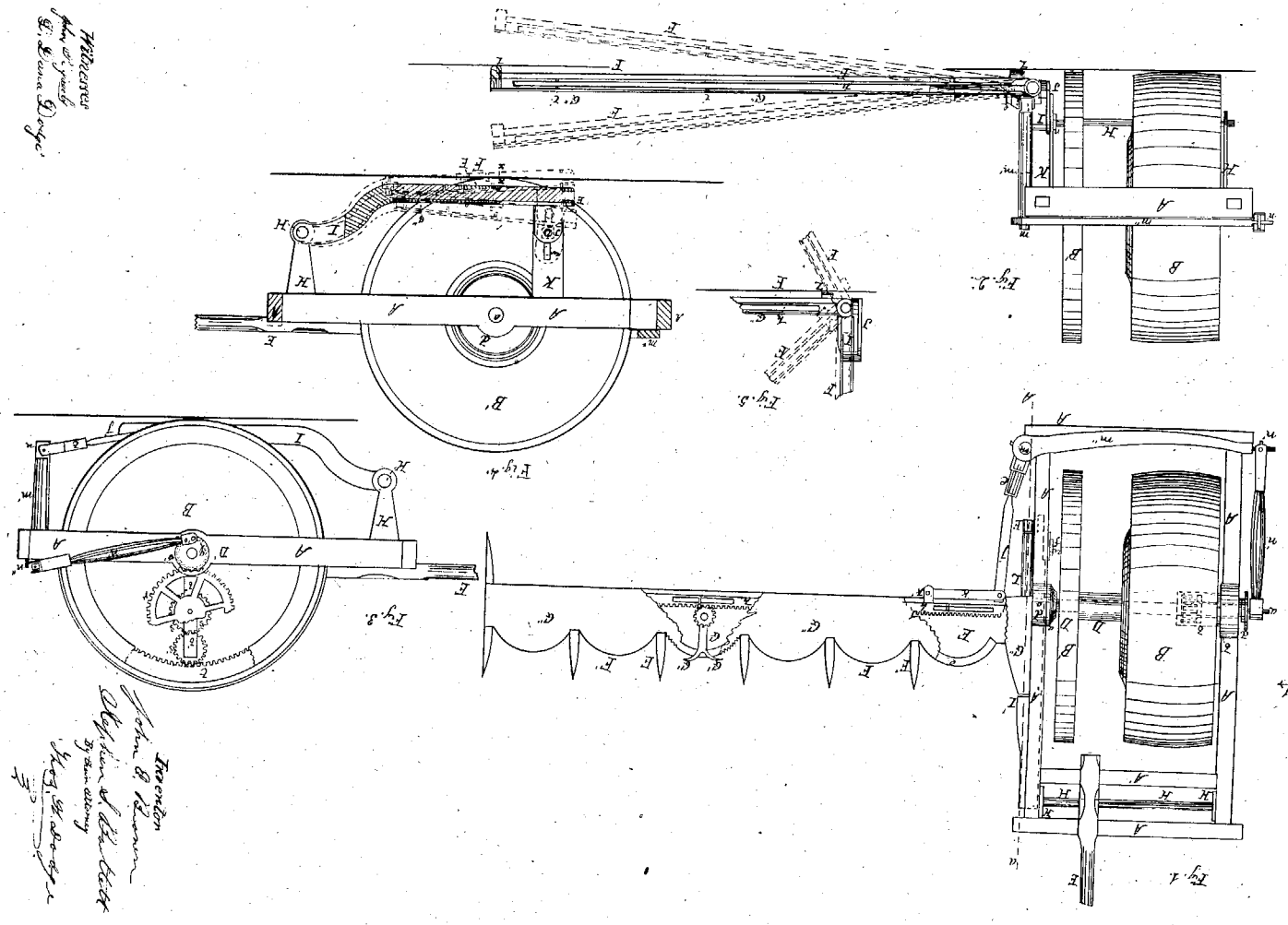
Witnesses
John D. Lynch
L. Dana Dodge
Inventors
John P. Brown
Stephen S. Bartlett
By their Attorney
Thos. H. Dodge

UNITED STATES PATENT OFFICE.

JNO. E. BROWN, OF WOONSOCKET, AND STEPHEN S. BARTLETT, OF PROVIDENCE, RHODE ISLAND, AND THOMAS H. DODGE, OF WASHINGTON, D. C., ASSIGNEES OF SAID JNO. E. BROWN AND STEPHEN S. BARTLETT.

IMPROVEMENT IN GRAIN AND GRASS HARVESTERS.

Specification forming part of Letters Patent No. 12,121, dated January 2, 1855; Reissue No. 1,111, dated January 1, 1861; Reissue No. 1,281, dated February 25, 1862.

*To all whom it may concern:*

Be it known that we, JOHN E. BROWN, of Woonsocket, in the county of Providence and State of Rhode Island, and STEPHEN S. BARTLETT, formerly of said Woonsocket, but now residing in the city of Providence, in said county of Providence and State of Rhode Island, have invented certain new and useful Improvements in Grain and Grass Harvesters; and we do hereby declare that the following is a full, clear, and exact description of the same, reference being had to the accompanying drawings, forming a part of this specification, in which—

Figure 1 represents a plan view of a Brown and Bartlett mowing-machine embracing our said improvements. Fig. 2 represents a rear view of the same machine with the finger-beam, being shown in three different positions, as will be more fully described hereinafter. Fig. 3 represents a side view, looking in the direction of arrow 1, Fig. 1, some of the parts being represented broken away to show the position of the gearing more fully. Fig. 4 represents in black lines a longitudinal section on line A *a*, Fig. 1; and Fig. 5 represents a detached section of some of the parts to illustrate the flexible connection of the finger-beam with the main frame, as will be hereinafter more fully set forth.

In the accompanying drawings, A A A A represents the main frame of the machine, and to which the other parts of the machine are attached or connected.

The main frame A A A A is supported by two wheels, B B′, fast on a common tubular shaft, D, which turns on a stationary axle or journal, D′, one end of which is fastened rigidly in the inner rail of the main frame, as seen at *a*. while the other or outer end of said journal D′ is supported in the lower end of spur-gear frame *b*, fastened to the inner side of the outer side piece or rail of the main frame.

In order to give journal D′ a still stronger and more secure support, it is provided with a circular hub, C, which fits against and is fastened to the inside of the inner rail or side piece of the frame, the latter having an elevation, *d*, on its upper side to correspond with the upper part of hub C on journal D′.

It will thus be seen that the wheels B B′, arranged, as shown, one at each side of the machine, support the main frame of the machine and prevent it from turning over laterally, while the rigid tongue E, (which is to be of any proper length and form,) to which the team is to be attached in any proper manner, prevents the frame from tipping up or down, either in front or rear, otherwise than as such motions are caused by the action of the team in passing over elevations or through depressions in the surface of the ground. The rear end of tongue E is fastened to a second cross-piece, A′, to give it greater strength and rigidity. F represents the finger-beam or cutter-stock, which may be made in the form represented—that is, with a series of curves, F′, and alternate points or fingers F″—or in such other form as may be desirable.

The tops of the curved parts F′ are faced with a metal plate or circular knife, *e*, over which the vibrating knives G traverse to sever the stalks of grain or grass. Only one knife G is represented, as this is sufficient to illustrate the operation; but it will be understood that a separate knife is to be employed on each curve. The cutters or knives G are made with two crooked or bent blades, G′ G′, each blade having two cutting-edges, so that it will cut each way. The knives or cutters are fastened to pinions, one of which is shown at *f*, which turn on studs or pins *g*, fastened to and projecting up from the finger-beam or cutter-stock F, and which pinions are operated by means of the rack-bar *h*, which is arranged to reciprocate lengthwise of the cutter-stock F, being kept in place during such operation by means of the guide-pieces *i*, which are fastened to stock F and pass up through slots in the rack-bar, with their heads projecting slightly over the top of the bar, as indicated in the drawings. The rack-bar *h* is operated and caused to reciprocate back and forth by means of the arm *j*, the front end of which is hinged or pivoted to link *k*, which in turn is pivoted to the rear projection, *k′*, on the rack-bar *h*. The rear end of arm *j* is turned off, so as to fit in and turn in the socket-piece *l*, whose rear end is hinged to the lower hub end of a vertical shaft, *m*, which turns in and is supported by a tubular stand, *m'*, fastened rigidly to the rear inner corner of the main frame.

To the upper end of the vertical shaft *m*, which projects above the tubular stand *m'*, is fastened one end of the lever *m''*. The other end of said lever projects beyond the outer side of the frame, and has its end turned down to pass through a swivel-piece, *n*, in the rear end of the connecting-rod *n'*, whose front end is connected with and works on the crank-pin *o* in the disk *o'* on the outer end of the tubular shaft *p*, which turns on the end of the journal D' and within the tubular part of box or gear frame *b*, which is made as follows: The inner part is made large enough to receive the gear *q* (shown in dotted lines, Figs. 1 and 3,) and is also open on the top to permit said gear and the gear *r* to work together. The outer end of the gear-frame *b* has a hub or projection, *b'*, by which said frame *b* is fastened securely to the outer rail of the main frame, a portion of the tubular part of said frame being inserted in the circular opening in the rail. The inner end of said gear-frame *b* is formed by having a vertical arm, *b''*, rising up at right angles to the tubular part, and in which the journals of the gears *r s s'* have their support. The gears *r* and *s* have one common journal or shaft, and to which they are both made fast, the former being on the outside of the upright piece *b''* and the latter on the inside, as fully indicated in the drawings.

The inside of the rim of wheel B is provided with an internal gear, *t*, which takes into and drives gear *s'* whenever the machine is drawn forward, and gear *s'* in its turn causes gears *s* and *r* to revolve, whereby the latter causes gear *q*, together with its tubular shaft, to revolve with increased speed, and that in its turn gives motion to the connecting-rod *n'*, which causes lever *m''* and its vertical shaft *m* to vibrate back and forth, thus giving a reciprocating motion to the cutters G through the instrumentality of rack-bar *h*, link *k*, lever or arm *j*, and socket-piece *l*. The cutter-stock, rack-bar, and rear of the cutters are covered by a metal plate, G'', or other suitable material, the front portion of which being curved to correspond or nearly correspond with the front of the cutter-stock. The front edge of this casing should be notched, so as to form teeth or fingers to support the stalks of grain or grass while being acted upon by the cutters, the roots affording sufficient support below the knives, so that teeth or fingers are unnecessary there.

In Fig. 1 the piece G'' is represented broken away in places to show the position of the parts underneath.

Wheel B is made hollow for the purpose of receiving the gearing, which, in many respects, is constructed and operates like the gearing patented to us December 20, 1853, and the same is true of the cutters and the mode of operating them by rack and gear.

Having given a general discription of the particular form of cutters and mode of operating them from the wheel B, (represented in the accompanying drawings,) we will proceed to describe the mode of connecting the cutter-stock or finger-bar to the main frame, and to which the invention which forms the subject of this patent more particularly relates.

From the front of the main frame depend two hangers, H H, in the lower ends of which, in suitable bearings, turns a shaft or journal, H'. To the inner end of this shaft or journal, which projects beyond the inner hanger for that purpose, is fastened the front elevated end of a drag-bar, I, the rear depressed end of which extends back at the grain or grass side of the machine and in a line parallel, or nearly so, with the line of motion of the machine, and is provided with an upright guide-piece, J, which is fastened to its rear end on the side next to the frame of the machine, the lower end of this guide-piece being flush with the bottom of the drag-bar or not extending below the same.

From the inner side of the main frame, and back of the axis of the main supporting-wheels, is fastened another guide-piece, K, which extends down far enough to pass by the inner side of the guide-piece J. The lower end of the guide-piece K is slotted out, as seen at *u*, to receive a stud or guide-pin, *v*, which projects from and is fastened to the upper end of guide-piece J. In order to prevent the guide pin or stud *v* from being wrenched out of place while using the machine, it passes through the guide-piece K sufficiently far to receive a stop-nut or screw-head, *w*, on its inner end, so that while it is left perfectly free to rise and fall in the slot *u* it is prevented from leaving the same, so that the machine can be safely used on rough and quite uneven ground.

A heel-piece or rock-shaft, L, is connected to the rear of drag-bar I, so as to be free to turn on its journals, the forward one being stepped in the projection I' of the drag-bar I, while the rear journal turns in a box, L', fastened to the rear of the drag-bar. The under side of the heel-piece or rock-shaft is cut or recessed out, as seen at *x*, Fig. 4, so as to receive the heel of the finger-bar or cutter-stock F, which is securely fastened therein by screws or bolts. As the heel or rock shaft is made separate from the finger-bar, it can be made strong without involving much cost or labor, while the heel of the finger-bar can be fitted into the recess in said heel-piece, so as to have a very firm connection. To avoid too much friction on the ground, the finger-bar or cutter-stock may be provided with runner or shoe pieces or projections—one at each end—as seen at Z Z.

From the above description it will be seen that as the machine is drawn over the ground the cutter-stock or finger-bar will be free to rise or fall bodily or at either end independent of the other end and without affecting the motion of the main frame, since the drag-bar is free to vibrate up and down at its rear end, to which the finger-bar is hinged, by reason of the shaft H′ turning freely in its bearings in the hangers H H, and thus if an elevation is passed over which has a tendency to raise the entire finger-bar the cutting apparatus rises bodily, while if the elevation is only at the heel end of the finger-bar then the outer end of the latter can hug the ground or even fall below the level upon which the driving wheels may be passing at the time, should a depression occur at the outer end, as indicated in red lines, Fig. 2.

It will be seen that rock-shaft H′ acts as a long lever to keep the drag-bar in line, and thus reduces the lateral strain on the guide-pieces at its rear end. Again, should an elevation occur at the outer end of the cutting apparatus only, then the outer end can rise to conform to such inequality, one such position being indicated in dotted lines, Fig. 2. Still again, should a depression occur in the ground between the wheel B′ and the outer end of the finger-bar, the heel end can fall to conform to such inequality or depression, while the outer end remains elevated, together with the wheels B and B′. This is owing to the freedom with which the rear end of the drag-bar can rise above or fall below the plane upon which the driving and carrying wheels are passing, as is illustrated by red and dotted lines, Fig. 4.

In Fig. 5 is illustrated more fully the wide range of motion of the rock-shaft and cutter-stock or finger-bar F, should it ever be necessary or desirable to place the cutting apparatus in such elevated or depressed positions. A cutting apparatus thus connected to the main frame cuts the stubble very close to the ground on uneven ground, since both ends of the finger-bar traverse upon the ground without affecting the motion of the main frame, while at the same time its position is not disturbed by either of the wheels passing over stones or hillocks or sinking into the hollows. The cutter-bar being hinged to the drag-bar, the attendant can raise it with facility to pass stones, stumps, or other obstructions without tipping the carriage. Consequently the utility of the machine is greatly augmented.

The position of the cutting apparatus being outside of the path of the inner main wheel and to the right of the main frame, the stalks of grass or material when cut fall directly back on the ground, there being nothing for them to lodge upon.

By supporting the cutting apparatus at the right of the machine, the driver can approach his team in the usual manner without getting in front of the cutters; or he can approach the rear of the finger-bar to clean the cutters or knives, if clogged, without getting in front of any part of the frame or connections. Again, when it is desired to move the machine from one field to another, or to pass over fields of mown grass, the finger-bar can be raised and then turned up in a vertical position at the side of the machine and there fastened by a rope, so that the machine may travel upon its own wheels from one field to another, occupying in its passage but little more space laterally than the width of the main frame, thereby enabling the machine to be moved from place to place and through gates of ordinary width with ease, and without the necessity of loading it and unloading it from another vehicle.

In the operations of the machine on uneven ground the arm *j* turns freely in the socket *l*, which allows the finger-bar to conform to the inequalities of the ground without disturbing or interrupting the action of the cutters, and also allows of the same being folded up at the side, as stated.

The driver's seat, it will be understood, is to be supported by the main frame in any well-known manner.

We contemplate that the cutter-stock or finger-bar may be fastened permanently to the drag-bar, or so that the entire finger-bar can be raised when the drag-bar is raised up and the drag-bar allowed to vibrate.

The drag-bar, being hinged so as to be drawn forward by its front end and from the front of of the machine, enables the cutting apparatus to pass over elevations in the ground with ease and without occasioning undue friction of the joints, as will be understood by those skilled in the art.

The mode of supporting the drag-bar, too, relieves the main frame of any very great liability to be wrenched out of shape, the main strain or draft necessary to draw the cutting apparatus over the ground coming, as it does, on the front of the frame, while only the strain or a portion thereof necessary to keep the drag-bar in line laterally is thrown upon the rear of the frame. The drag-bar I may be made in the form represented, or in such other form as may be desirable.

It sometimes happens that deep gullies are found in fields, and the rear end of drag-bar I and the heel of the finger-bar or cutter-stock would be liable to fall too low down in passing such places were it not for the guide pin or stud *v*, which strikes against the bottom of slot *u* when the drag-bar falls too low down, and thus arrests its further descent.

Some of the parts of our invention are made the subject of separate patents of even date herewith.

It is manifest that our invention or parts thereof may be applied to other harvesting-machines.

Having shown one practical mode of applying the same to use, what we claim, and desire to secure under this patent as our invention, is—

1. The combination of a hinged or yielding drag-bar, I, or its equivalent, with the main frame and finger-bar or cutter-stock of a harvesting-machine in such a manner that as the frame is advanced the drag-bar or its equivalent will be advanced, and that in its turn will draw forward the finger-bar which supports the cutting apparatus, which is left free to rise or fall bodily (or at the heel end, while the outer end rests on a lower surface) without affecting the motions of the main frame.

2. The use and employment, in a harvesting-machine, of a yielding drag-bar, or its equivalent, arranged on the inner side of the machine, in combination with hinging the heel of the finger-bar to said drag-bar, whereby the entire cutting apparatus is left free to rise or fall bodily or either end thereof independent of the other, and without affecting the motions of the main frame.

3. Hinging the front elevated end of a drag-bar, to which the heel of the finger-bar is connected in a harvesting-machine, to the front inner side of the main frame, in combination with giving said drag-bar a lateral support in rear of the axis of the main wheels, whereby the strain on the frame is divided, while the rear end of the drag-bar is retained in proper position, but left free to rise and fall independent of the main frame, for the purposes stated.

4. Fastening the heel end of the finger-bar, which supports the cutting apparatus in a harvesting-machine, to a heel-piece, which in turn is hinged in a recess in the end of a yielding drag-bar, whereby the cutting apparatus is properly supported and kept in position at the side of the machine, and yet left free to conform to the inequalities of the ground, without affecting the motions of the main frame.

5. The combination of the drag-bar I with rock-shaft H′ and the front of the main frame, substantially as set forth.

6. The use of a single draw or drag bar attached at its forward and elevated end to the machine by a connection, so that its rear end can rise and fall, as specified, in combination with a hinged or rigidly-connected cutter-stock or finger-bar, for the purposes specified.

7. Hinging the finger-bar in a grass-harvesting machine to a vibrating drag-bar or equivalent device when said drag-bar or equivalent device is used for the purpose of sustaining and supporting the cutting apparatus to the right of the path of the inner main wheel of the machine, and of allowing it to conform freely to the uneven surface of the ground while the machine is in operation.

In testimony whereof we have hereunto subscribed our names.

JOHN E. BROWN.
STEPHEN S. BARTLETT.

Witnesses:
THOMAS STEEN,
ALBERT MOWRY.